United States Patent [19]

Powell, Jr.

[11] Patent Number: 4,660,665

[45] Date of Patent: Apr. 28, 1987

[54] ACCURATE WEIGHT SIZING

[76] Inventor: Harry Powell, Jr., c/o Rt. 6, Faber, Va. 22938

[21] Appl. No.: 837,255

[22] Filed: Mar. 7, 1986

[51] Int. Cl.⁴ .................... G01G 19/00; G01G 11/00; B07C 5/28
[52] U.S. Cl. ........................................ 177/145; 177/1; 198/504; 209/592
[58] Field of Search .................... 177/1, 145; 198/504, 198/505; 209/592, 594, 645, 649

[56] References Cited

U.S. PATENT DOCUMENTS 4,262,807  4/1981  Leverett .
4,403,669  9/1983  Raz ..................................... 177/145
4,413,690  11/1983 Peterson .

FOREIGN PATENT DOCUMENTS 0060013  9/1982  European Pat. Off. .
1176396  1/1970  United Kingdom .
1549785  8/1979  United Kingdom .
2110393  6/1983  United Kingdom .

Primary Examiner—George H. Miller, Jr.
Attorney, Agent, or Firm—Nixon & Vanderhye

[57] ABSTRACT

A method and apparatus provide for accurate weighing of fruit or like product while continuously conveying the product in a first direction. During weight sizing of the fruit, the fruit is continuously conveyed in the first direction utilizing a fruit cup supporting the fruit. The fruit cup is mounted for pivotal movement with respect to a yoke about a horizontal axis perpendicular to the first direction. The yoke preferably is connected to a tow rod which effects conveyance of the product container. The amount of pivotal movement of the cup about the axis is limited. Support structures extend downwardly from the cup into operative engagement with weighing mechanism tracks on only one side of a line extending in the first direction through the center of gravity of the cup. The leading and trailing edges of the weighing mechanism track segments are spaced (in conjunction with the support structures) so that the entire weight of the cup and product are transferred instantaneously to the weighing mechanism.

13 Claims, 7 Drawing Figures

ACCURATE WEIGHT SIZING

BACKGROUND AND SUMMARY OF THE INVENTION

In the sorting of fruit by weight, typically known as weight sizing, it is conventional to continuously convey a cup supporting each individual piece of fruit over a weighing scale or like mechanism so that the weight of the piece of fruit in each cup can be determined, and the cup can then be dropped at a future position depending upon the weight recorded. In more sophisticated systems, it is desirable to calculate the cumulative weight of all pieces of fruit deposited at a particular site to see that that cumulative weight exceeds a minimum weight but is within a specified tolerance. One example of that procedure is where it is desired to bag a quantity of fruit, such as a bag of apples, that is as little over the minimum weight (e.g. 3 pounds) as possible.

During weight sizing, it is of course desirable to convey the product as quickly as possible while ensuring accurate weighing of the individual pieces of fruit. Those two objectives are often mutually exclusive, however, and significant inaccuracies can occur. For instance utilizing the weight sizing apparatus such as shown in U.S. Pat. No. 4,262,807, typically the weight of each individual piece of fruit will read 5 percent lighter when that piece of fruit is weighed during active conveyance than the real weight of the fruit (i.e. weighed by the same weighing mechanism in a static condition). These inaccuracies relate to the inter-connections that are provided between the components of the sizing apparatus, and because of up and down movement of the fruit container with resulting frictional components that tend to distort the accuracy of the weight determination.

By utilizing a sizing apparatus in which the fruit cup containing the fruit is instantaneously transferred from a conveyance mode to a weighing mode (in operative association with the weighing mechanism), it is possible to significantly reduce the inaccuracies of the weighing in the active mode (as opposed to a static condition). For instance, a commercial weight sizer according to the structure and method illustrated in abandoned patent application Ser. No. 624,108 filed June 25, 1984, reads only about 3 percent lighter in an active conveyance mode than in the static weighing mode. However even a weight difference as little as 3 percent can be undesirable if consistent and accurate bagging is desired.

According to the present invention, a weight sizing apparatus and method are provided which are even more accurate than the procedures described above. According to the present invention, it is possible to weigh fruit, and like products, in an active conveyance mode with an accuracy of about 1 percent compared to the static mode. This is accomplished according to the present invention by cancelling out frictional up and down components that are typical of prior art procedures.

Not only is the apparatus according to the present invention more accurate, it is also easier to install and there is less wear on a number of the operative components thereof. Further, the apparatus according to the invention can be made so that the fruit cups are reversible so that not only do the cups last longer than prior art cups because of less wear, when operative components thereof are worn out the cup may merely be reversed, thus doubling its already extended life.

According to one aspect of the present invention an apparatus is provided for weight sizing of product, such as apples, tomatoes, or the like. The apparatus comprises the following elements: Product containing means for containing a product to be weighed by the weighing mechanism. Conveyance means for conveying the product containing means in a first direction. Track means connected to the weighing mechanism for supporting the product containing means during simultaneous weighing and conveyance. The product containing means, when containing a product, having a center of gravity, and the center of gravity being along a first line approximately bisecting the product containing means in the first direction. Support means associated with the product containing means for engaging the track means. The support means and the track means being provided in operative engagement with each other only on a first side of the first line; and connecting means for connecting the product containing means to the conveyance means so that when the support means engage the track means during weighing the product containing means is supported on a second side of the first line, opposite the first side, by the conveyance means although the conveyance means does not interfere with accurate weighing of product contained within the product containing means.

The track means comprises two distinct track segments connected to the weighing mechanism and extending parallel to each other and in the first direction, the track segments comprising first and second segments spaced from each other in the second direction; and the support means comprises first and second active support structures extending downwardly from the product containing means, both of the support structures being disposed on the first side of the line, while the support structures are disposed on opposite sides of a second line, the second line extending through the center of gravity in the second direction and substantially bisecting the product containing means. The first and second support structures are spaced from each other in the second direction so that only one of the support structures engages each of the track segments, and the first and second support structures are spaced from each other along the first direction a distance X. Each of the first and second track segments has a trailing edge thereof in the first direction, the trailing edges being spaced from each other a distance essentially equal to X.

Since track segments are not provided on both sides of the product containing means (fruit cup) there is no bouncing or jittering and therefore less inaccuracy. Also it is easier to align the track segments since they are right next to each other, and misalignments have a less significant affect on the operation of the apparatus.

According to another aspect of the invention, a fruit sizing cup assembly is provided. The assembly comprises the following components: A body for supporting a piece of fruit or the like, the body having a leading end, a trailing end, a top surface having formed therein a depression for receiving a piece of fruit, a bottom surface, and a pair of side surfaces, the side surfaces being generally parallel to each other. A yoke comprising an elongated main portion including means for attaching the yoke to a conveyance mechanism, and a pair of arms extending outwardly from the yoke on the same side thereof and generally parallel to each other. Means for pivotally mounting the body to the yoke arms so that the body may pivot with respect to the yoke arms about an axis extending generally perpendicular to the yoke arms and the body sides, and through the approximate center of gravity of the body; and means for limiting the pivotal movement of the body about the axis to a few degrees of pivotal rotation so that fruit conveyed by the body will not fall out merely by pivotal movement of the body with respect to the yoke about the axis.

A pair of active support structures also are provided extending downwardly from the bottom portion of the body, the active support structures being disposed on the same side of a first line extending through the center of gravity of the body generally parallel to the body sides, and the support structures being disposed on the opposite sides of the axis of rotation extending through the center of gravity generally parallel to the trailing and leading ends of the body. A pair of redundant support structures are disposed on the opposite side of the first line as the active support structures, and are substantially identical to the active support structures, so that after the active support structures wear down the body is reversible and the redundant support structures become active support structures.

According to yet another aspect of the present invention, an improved accuracy method of weighing product contained within a product container is provided. The method utilizes a weighing mechanism, and comprises the following steps: (a) Continuously conveying the product contained in the product container in a first direction by towing the product container with a tow rod which extends in a second direction, perpendicular to the first direction. (b) While continuously conveying the product in the product container, supporting the product container in a conveyance mode wherein it is not in operative association with the weighing mechanism. (c) At a given point in time during continuous conveyance of the product in the product container, conveying the product container in a weighing mode wherein it is in operative association with the weighing mechanism. (d) During conveyance in the weighing mode, supporting the product container on the weighing mechanism only on a first side of a line extending through the center of gravity of the product and product container in the first direction while providing for pivotal movement of the product container with respect to the tow rod about an axis parallel to the tow rod. (e) During conveyance in the weighing mode, supporting the product container on opposite sides of the axis of rotation; and, (f) instantaneously transferring the product container from the conveyance mode to the weighing mode.

It is the primary object of the present invention to provide an accurate, long life, and easily installed apparatus for weight sizing of fruit, or like products, and provide an associated method. This and other objects of the invention will become clear from an inspection of the detailed description of the invention, and from the appended claims.

DETAILED DESCRIPTION OF THE DRAWINGS

The invention will be primarily described with respect to weight sizing of fruit, such as apples, although it has broader applicability. The particular details of the apparatus connected to the conveyance means according to the invention, and the apparatus for dropping the fruit cups at preselected points, as well as the computer controls therefor, are not described herein since they are not related specifically to the present invention which is directed to particular apparatus for accurately weighing of the product during conveyance. Details of conventional conveying, cup dropping and like components may be seen, however, in U.S. Pat. Nos. 4,413,690 and 4,254,877.

Figure 1:
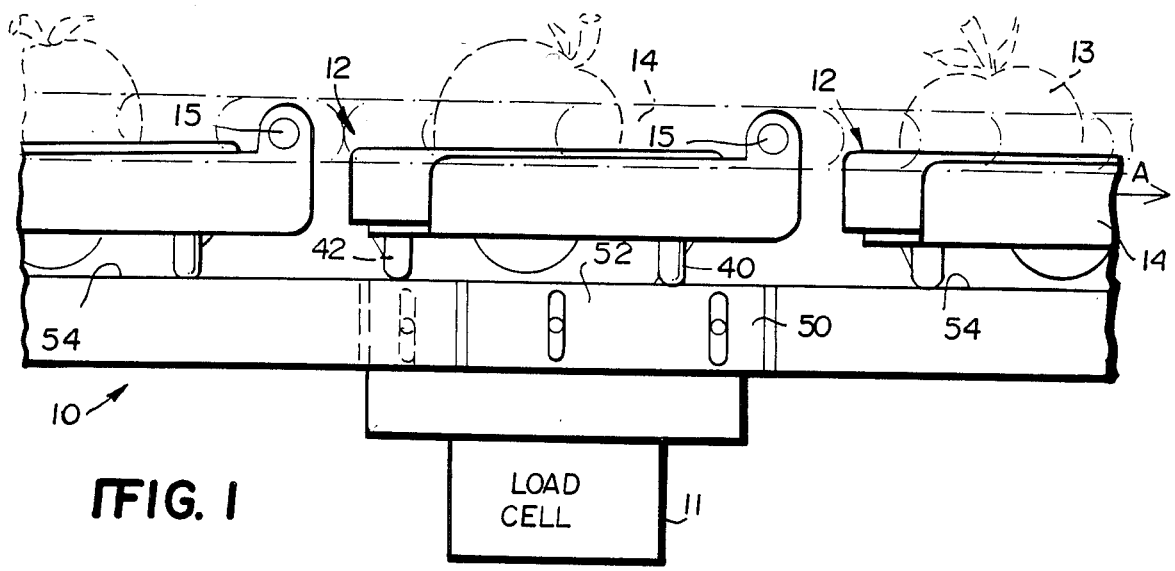
FIG. 1 is a side partial schematic view illustrating exemplary apparatus for weight sizing according to the present invention.
Figure 7:
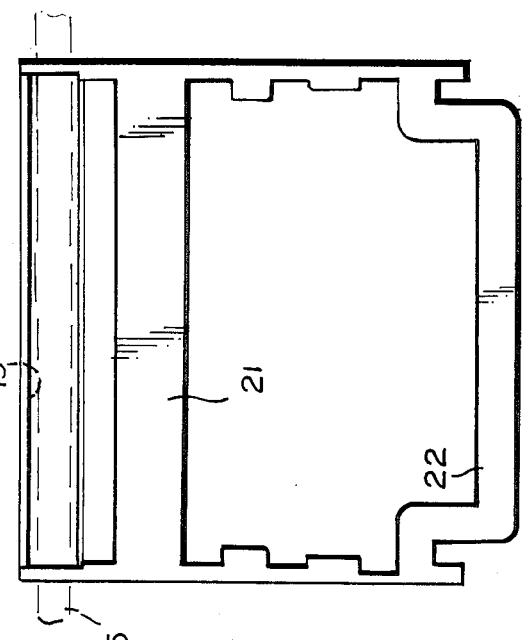
FIG. 7 is a top plan view of only the yoke assembly of an exemplary apparatus according to the invention.
Figure 4:
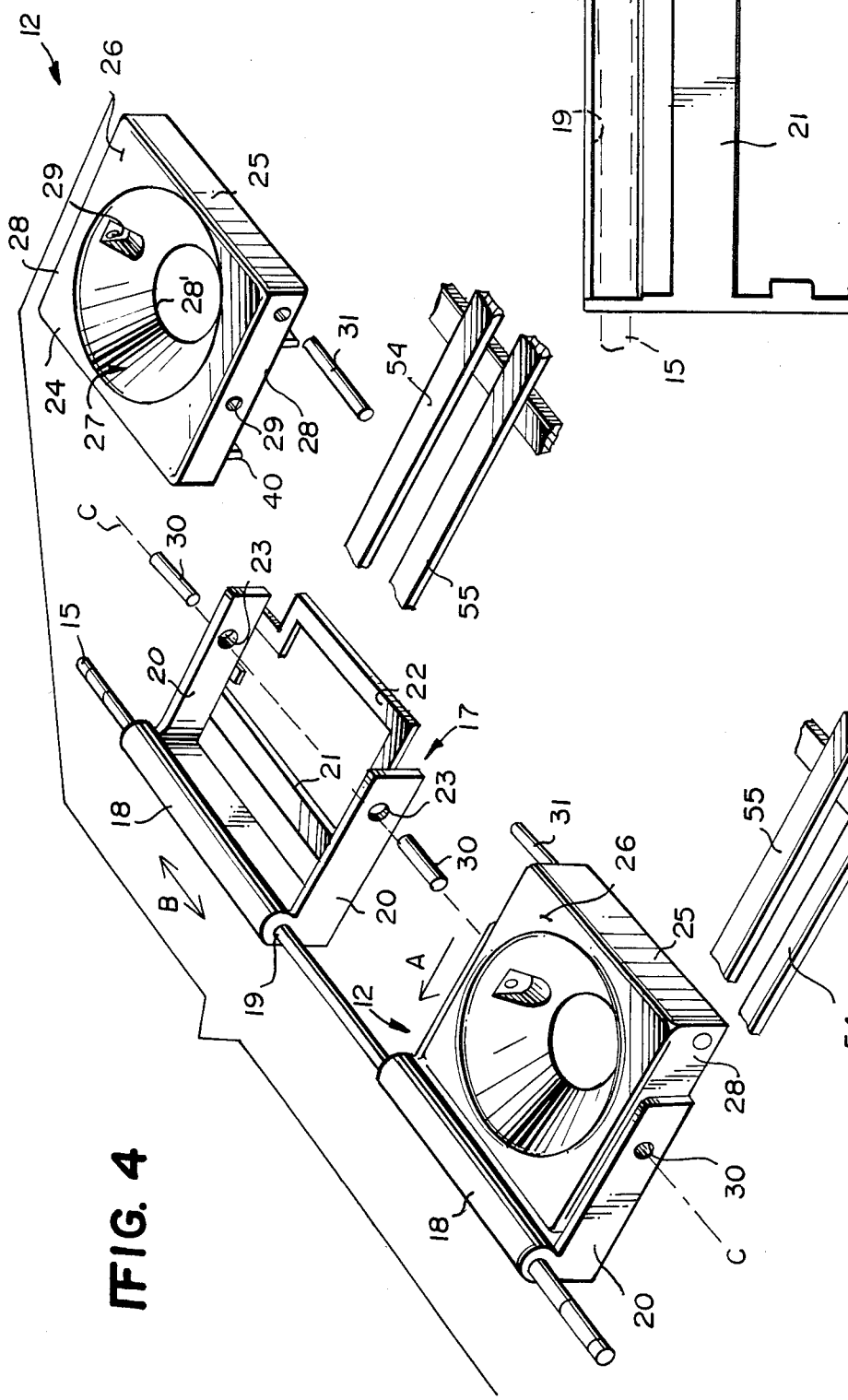
FIG. 4 is a perspective view of the apparatus of FIG. 1 showing one of the product containing cups in exploded view.

Exemplary apparatus according to the prevention is illustrated generally by reference numeral 10 in FIG. 1. The apparatus includes a weighing mechanism, such as a load cell 11, and product containing means, such as fruit cups 12, for supporting a product (such as an apple 13) to be weighed by the weighing mechanism 11. Conveyance means, such as continuous conveyor chains 14 on each side of the cups 12, and operating with tow rods 15 associated with the cups 12, convey the product 13 in a first, preferably generally horizontal, direction A. According to the present invention, the product containing means, or fruit cup, 12 is mounted to the tow rod 15, or like conveyance mechanism, by a yoke 17, seen most clearly in FIGS. 4 and 7.

The yoke 17 includes a main portion 18 which is elongated and comprises means for attaching the yoke to the tow rod 15. Such means include a through-extending generally circular in cross-section passageway 19 extending through the main portion 18, and having a diameter only very slightly greater than the outside diameter of the tow rod 15. The yoke 17 further comprises a pair of arms 20 which extend generally in the first direction A, and generally perpendicular to the main portion 18 which extends in a second direction B perpendicular to the first direction A. Also, connecting bars are provided for connecting the arms 20 together, the connecting bars being illustrated by reference numerals 21 and 22 in FIGS. 4 and 5. Note that the connecting bars 21, 22 are disposed on opposite sides of a line C which defines an axis which is parallel to the direction B, and spaced from the tow rod 15, and extends through the centers of circular openings 23 formed in the arms 20. In addition to providing rigidity for the yoke assembly 17, the connecting bars 21, 22 provide stop means for limiting pivotal movement of the cup 12 with respect to the yoke 17 in a manner hereinafter described. The yoke assembly 17 preferably is formed of a single piece of rigid durable, molded plastic.

Note that the cup 12 has a leading end 24, a trailing end 25, a top 26 which includes the depression or cup 27 therein (including the open bottom 28 thereof), and a pair of sides 28, the sides extending generally parallel to the direction A. The container 12 is dimensioned with respect to the yoke 17 as illustrated in the drawings, and is mounted with respect to the yoke 17 so that it is pivotal about the axis C (which is generally horizontal) with respect to the yoke assembly 17. The pivotal mounting means for so mounting the container 12 preferably include means defining the openings 29 in the sides 28 of the container 12, the openings 23 in the yoke arms 20, and the pivot posts 30 which engage both the yoke assembly 17 and container 12 in the openings 23, 29 respectively.

The bars 21, 22 provide means for limiting the pivotal movement of the container 12 with respect to the yoke assembly 17 to a few degrees so that the container 12 will not rotate enough about axis C so that an apple, or other product, received by the depression 27 will fall out of the container 12. The apple will be discharged from the container 12 only when the entire yoke assembly, with pivotally connected container 12, drops by pivoting about the tow rod 15. This occurs when the tripping rod 31 no longer engages a support, as is conventional and as is described in the previously cited patents.

The container 12 also includes a bottom 33 from which support structures extend, which support structures engage tracks associated with the load cell 11. Also associated with the bottom 33 of the container 12 are stop portions 35 (see FIG. 6) which cooperate with the bar 22 for limiting pivotal movement about axis C in one direction, and surface portions 37 which cooperate with bar 21 in limiting pivotal movement in the other direction.

The support structures associated with the container 12 are illustrated generally by reference numerals 40, 41, 42, and 43 in the drawings. The support structures 40–43 may take a wide variety of forms, have a wide variety of dimensions and configurations, and be formed of a wide variety of materials all depending upon the particular product being conveyed, and like circumstances. For instance the support structures may be formed as rollers, bosses, pins, levers, or the like. For the embodiment illustrated in the drawings, the support structures 40–43 are illustrated as tabs which extend downwardly from bottom portions of the cup 12, and have rounded bottoms—such as the rounded bottom 45 illustrated for tab 41 in FIG. 3—which engage the track surfaces and move smoothly therealong.

Figure 3:
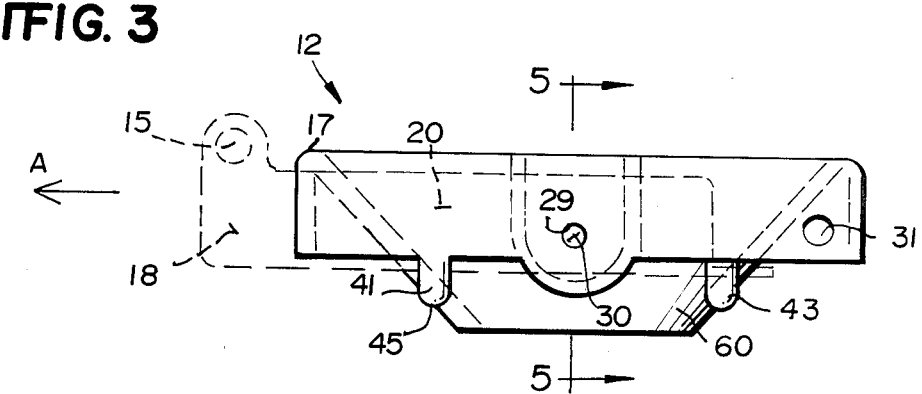
FIG. 3 is a side view of an exemplary product container according to the present invention, showing an exemplary yoke associated therewith in dotted line.
Figure 5:
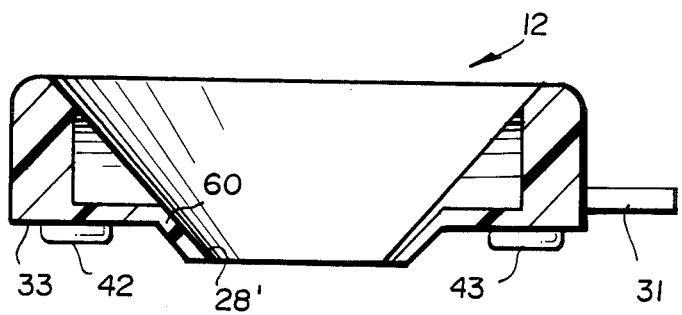
FIG. 5 is a cross-sectional view of the container of FIG. 3 taken along lines 5—5 thereof.
Figure 6:
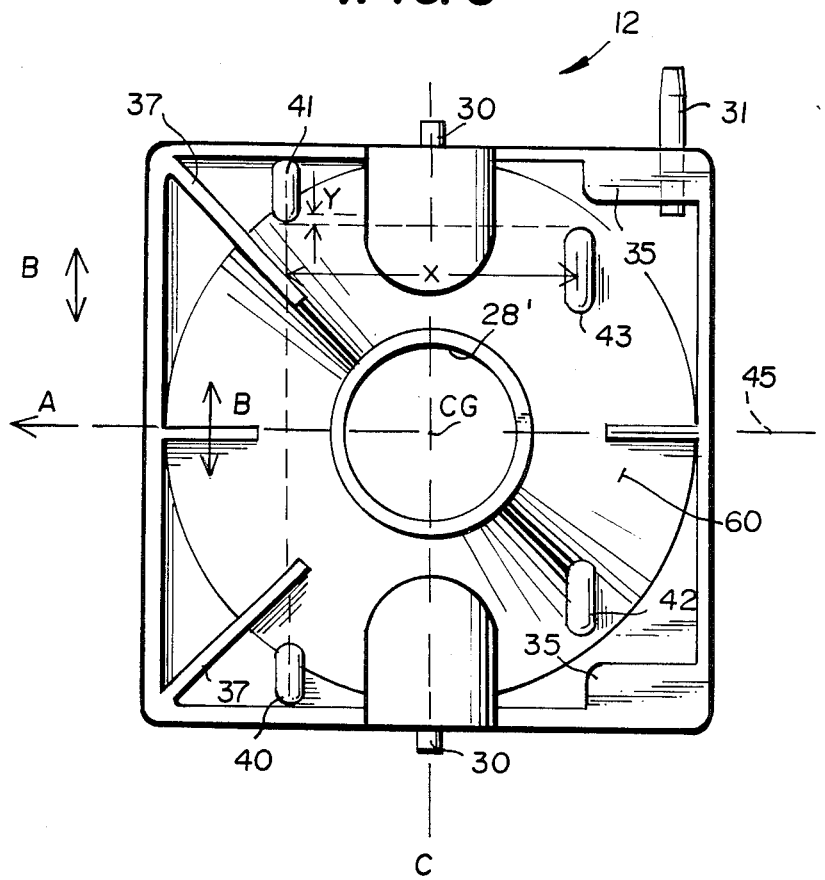
FIG. 6 is a bottom plan view of the product container of FIGS. 1 and 3 through 5.

Only one set of support structures are active at any one time, the other set being redundant. For instance, for the cup illustrated at the top right hand corner of FIG. 4 (which is the same cup as illustrated in FIG. 6) the active support structures are the tabs 41, 43 while the tabs 40, 42 are redundant. For the cup at the lower left hand portion of FIG. 4, which is also illustrated in FIGS. 3 and 5, the tabs 40, 42 are active and the tabs 41 and 43 are redundant.

Note particularly the spacing of the tabs of each set with respect to each other. The active tabs 41, 43 are disposed on the same side of a first line 45 extending through the center of gravity CG of the container 12 (and contained piece of fruit), which line 45 extends in the first direction A. Also the tabs 41, 43 are disposed on opposite sides of the axis C. They are spaced from each other in the dimension A a distance X, and are spaced from each other in the dimension B a distance Y (see FIG. 6).

Figure 2:
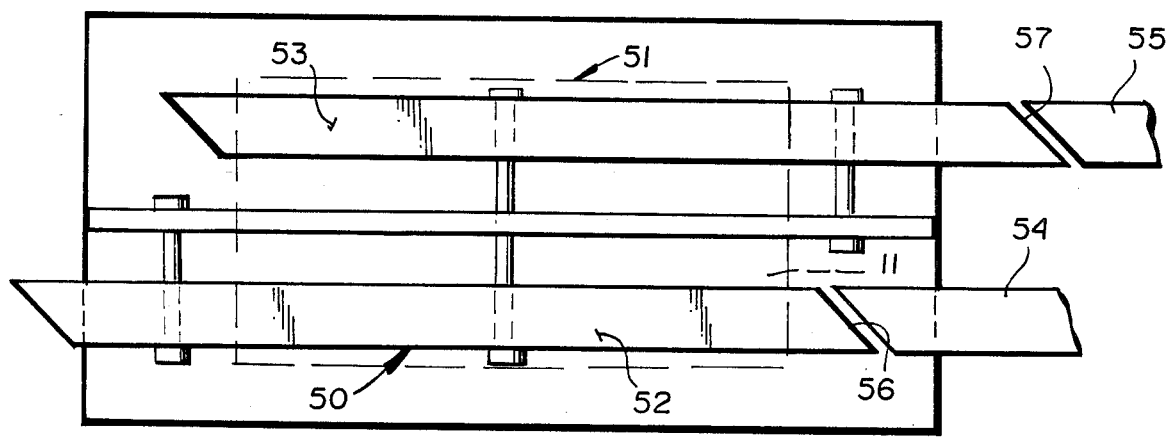
FIG. 2 is a top plan view showing operative components of the weighing mechanism of FIG. 1.

The tabs 41, 43 preferably cooperate with different track segments. For example, associated with the load cell 11 are two different track segments 50, 51, the track segment 50 having a top surface 52, and the segment 51 having a top surface 53. Tab 41 engages segment 50 through surface 52, while tab 43 engages segment 51 through surface 53. Note that there are stationary tracks which engage the tabs 41, 43 and are in alignment with the load cell supported segments 50, 51. For instance see FIGS. 2 and 4, in which the stationary track 54 is in alignment with the load cell supported track segment 50, while the stationary track 55 is in alignment with the load cell supported track segment 51.

The track segments 50, 51 can be connected to the load cell 50 in any conventional way, such as shown in the commercial structure shown in said abandoned application Ser. No. 604,108.

The tracks 54, 55, and the track segments 50, 51, are essentially parallel to each other, extending in dimension A. Since only two tracks and track segments are provided, both mounted on the same side of the center of gravity of the container 12, they are easy to align and there is a minimum of up and down movement or jostling of the container 12 as it is conveyed in the direction A.

In order to ensure maximum accuracy, and to eliminate the possibility that certain "resonant" speeds will adversely affect the operation of the load cell 11, preferably the container 12, with product 13 therein, is transferred from the conveyance mode to the weighing mode instantaneously. This is accomplished by providing the trailing edges 56, 57 (see FIG. 2), of the track segments 50, 51, respectively so that they are spaced from each other a distance X, the same spacing in the direction A as the spacing of the tabs 41, 43. In this way, both tabs 41, 43 move onto, and off of, their cooperating load cell supported track segments 50, 51, respectively, while supporting the container 12 on opposite sides of the axis C.

The tabs 40, 42 are provided in addition to the tabs 41, 43, so that the container 12 is reversible and when the tabs 41, 43 wear out the container may merely be disconnected from the yoke assembly 17, turned 180° about a vertical axis, and reassembled to the yoke 17.

Alternately, the tracks may be reversed to the opposite side of the cup, to engage the fresh surfaces.

The container 12 illustrated in the drawings—as previously mentioned—is illustrated as a fruit cup. Preferably the body of the cup 12 (see FIG. 5 in particular) is an integral piece of plastic. It includes a generally truncated cone-shaped central portion 60 which is adapted to receive the product 13 therein, and with the center of gravity of the container-product combination preferably provided adjacent the imaginary apex of the truncated cone 60. Preferably the tabs 40–43 are also of plastic and are integrally molded with the body of the cup 12.

In operation of the apparatus 10 according to the present invention, in the weighing mode, the tabs 41, 43 engage the weighing mechanism 11 on one side of the line 45, while the opposite side of the cup is supported by the tow rod 15, the yoke assembly 17 and the pivot posts 30 comprising connecting means for connecting the container 12 to the tow rod 15 so that when the supports 41, 43 engage the track segments 50, 51 during weighing the container 12 is supported on the opposite side of line 45 from the supports 41, 43 by the tow rod 15, but the tow rod 15 does not interfere with accurate weighing of the container. As a matter of fact the accuracy of the apparatus 10 is within about 1 percent of the true weight of the product (that is in the static mode).

It will thus be seen that according to the present invention a method and apparatus have been provided which facilitate the accurate weighing of product during continuous conveyance thereof and essentially irrespective of conveyance speed. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods and apparatus.

What is claimed is:

1. Product weight sorting apparatus comprising:
   a weighing mechanism;
   product containing means for containing a product to be weighed by said weighing mechanism;
   conveyance means for conveying said product containing means in a first direction;
   track means connected to said weighing mechanism for supporting said product containing means during simultaneous weighing and conveyance; said product containing means, when containing a product, having a center of gravity, said center of gravity being along a first line approximately bisecting said product containing means in said first direction;
   support means associated with said product containing means for engaging said track means;
   said support means and said track means being provided in operative engagement with each other only on a first side of said first line; and
   connecting means for connecting said product containing means to said conveyance means so that when said support means engage said track means during weighing said product containing means is supported on a second side of said line, opposite said first line, by said conveyance means although said conveyance means does not interfere with accurate weighing of product contained within said product containing means.

2. Apparatus as recited in claim 1 wherein said conveyance means comprises a tow rod extending in a second direction, perpendicular to said first direction.

3. Apparatus as recited in claim 1 wherein said connecting means comprises a yoke having a main portion receiving said tow rod therein and rotatable about said tow rod while not allowing substantial longitudinal movement therebetween; a pair of arms extending from said main portion, said arms extending generally in said first direction and being substantially parallel to each other, one in operative association with each side of said product containing means; and pivot means for allowing pivotal movement of said product containing means with respect to said arms about an axis extending in said second direction, parallel to but spaced from said tow rod.

4. Apparatus as recited in claim 3 wherein said connecting means further comprises means for limiting the pivotal movement of said product containing means with respect to said arms to a few degrees so that product conveyed by said product containing means will not fall out merely by pivotal movement of said product containing means about said axis.

5. Apparatus as recited in claim 4 wherein said product containing means comprises a plastic cup having sidewalls which are operatively pivotally connected to said arms, having a top with a depression for receiving a product therein, and an opening at the bottom thereof, and front and leading edges extending in said second direction, and a tripping rod extending outwardly from one side of said cup.

6. Apparatus as recited in claim 5 wherein said track means comprises two distinct track segments connected to said weighing mechanism and extending parallel to each other and in said first direction, said track segments comprising first and second segments spaced from each other in said second direction; and wherein said support means comprises first and second support structures extending downwardly from said product containing means, both of said support structures being disposed on said first side of said first line, while said support structures are disposed on opposite sides of a second line, said second line extending through said center of gravity in said second direction and approximately bisecting said product containing means said first and second support structures being spaced from each other in said second direction so that only one of said support structures engages each of said track segments, and said first and second support structures being spaced from each other along said first direction a distance X.

7. Apparatus as recited in claim 6 wherein each of said first and second track segments has a trailing edge thereof in said first direction, said trailing edges being spaced from each other a distance essentially equal to X.

8. Apparatus as recited in claim 7 wherein said support structures comprise tabs extending downwardly from a bottom portion of said product containing means and wherein a redundant set of tabs is provided associated with said product containing means on the opposite side of said first line, so that said product containing means is reversible.

9. Apparatus as recited in claim 1 wherein said track means comprises two distinct track segments connected to said weighing mechanism and extending parallel to each other and in said first direction, said track segments comprising first and second segments spaced from each other in said second direction; and wherein said support means comprises first and second support structures extending downwardly from said product containing means both of said support structures being disposed on said first side of said first line, while said support structures are disposed on opposite sides of a second line, said second line extending through said center of gravity in said second direction and approximately bisecting said product containing means said first and second support structures being spaced from each other in said second direction so that only one of said support structures engages each of said track segments, and said first and second support structures being spaced from each other along said first direction a distance X.

10. Apparatus as recited in claim 9 wherein each of said first and second track segments has a trailing edge thereof in said first direction, said trailing edges being spaced from each other a distance essentially equal to X.

11. Apparatus as recited in claim 1 wherein said support structures comprise tabs extending downwardly from a bottom portion of said product containing means and wherein a redundant set of tabs is provided associated with said product containing means on the opposite side of said first line, so that said product containing means is reversible.

12. A method of weighing a product contained within a product container utilizing a weighing mechanism comprising the steps of:
 (a) continuously conveying the product contained in the product container in a first direction by towing the product container with a tow rod which extends in a second direction, perpendicular to the first direction;
 (b) while continuously conveying the product in the product container, supporting the product container in a conveyance mode wherein it is not in operative association with the weighing mechanism;
 (c) at a given point in time during continuous conveyance of the product in the product container, conveying the product container in a weighing mode wherein it is in operative association with the weighing mechanism;
 (d) during conveyance in the weighing mode, supporting the product container on the weighing mechanism only on a first side of a line extending through the center of gravity of the product and product container in the first direction while providing for pivotal movement of the product container with respect to the tow rod about an axis parallel to the tow rod; and
 (e) during conveyance in the weighing mode, supporting the product container on opposite sides of the axis of rotation.

13. A method as recited in claim 12 comprising the further step (f) of instantaneously transferring the product container from the conveyance mode to the weighing mode.

* * * * *